United States Patent
Jahnke et al.

[11] Patent Number: 6,090,356
[45] Date of Patent: Jul. 18, 2000

[54] REMOVAL OF ACIDIC GASES IN A GASIFICATION POWER SYSTEM WITH PRODUCTION OF HYDROGEN

[75] Inventors: Frederick C. Jahnke, Rye, N.Y.; William P. Volk, Danbury, Conn.

[73] Assignee: Texaco Inc., White Plains, N.Y.

[21] Appl. No.: 09/150,846

[22] Filed: Sep. 10, 1998

Related U.S. Application Data

[60] Provisional application No. 60/058,748, Sep. 12, 1997.

[51] Int. Cl.$^7$ .................. C10K 1/08; C01B 3/00
[52] U.S. Cl. .................. 423/210; 423/220; 423/226; 423/242.1; 423/242.2; 423/573.1; 423/650; 252/373; 60/39.12; 95/235; 95/236
[58] Field of Search .................. 423/220, 226, 423/573.1, 650, 242.2, 242.1, 210; 48/197 R; 60/39.02, 39.12; 95/235, 236; 252/373

[56] References Cited

U.S. PATENT DOCUMENTS

| | | | |
|---|---|---|---|
| 3,966,875 | 6/1976 | Bratzler et al. | 423/220 |
| 4,202,167 | 5/1980 | Suggitt et al. | 60/39.02 |
| 4,242,108 | 12/1980 | Nicholas | 55/40 |
| 4,254,094 | 3/1981 | Hegarty | 423/648 R |
| 4,568,364 | 2/1986 | Galstaun et al. | 55/43 |
| 4,957,515 | 9/1990 | Hegarty | 55/43 |
| 5,152,975 | 10/1992 | Fong et al. | 423/652 |
| 5,232,467 | 8/1993 | Child et al. | 48/127.3 |
| 5,240,476 | 8/1993 | Hegarty | 97/161 |
| 5,345,756 | 9/1994 | Jahnke et al. | 60/39.02 |

*Primary Examiner*—Steven P. Griffin
*Assistant Examiner*—Timothy C Vanoy
*Attorney, Agent, or Firm*—Harold J. Delhommer; Rodman & Rodman

[57] ABSTRACT

This invention is an integrated process which removes acidic gases such as $H_2S$, COS and $CO_2$ from raw synthesis gas. The $H_2S$ and COS is concentrated and separately recovered. The separately recovered $CO_2$ is used as a moderator with the purified syngas in a combustion turbine. The process comprises separating $H_2S$ and COS from a raw synthesis gas by absorption with a liquid solvent, removing coabsorbed $CO_2$ by stripping the solvent with nitrogen, separating the $H_2S$ and COS from the solvent and recovering sulfur from the $H_2S$ and COS. The energy value of the $CO_2$ and its value as a diluent in reducing $NO_x$ is recovered by using the $CO_2$ as a moderator during combustion of the purified synthesis gas in a gas turbine.

10 Claims, 3 Drawing Sheets

REMOVAL OF ACIDIC GASES IN A GASIFICATION POWER SYSTEM WITH PRODUCTION OF HYDROGEN

BACKGROUND OF THE INVENTION

This application claims the benefit of U.S Provisional Application No. 60/058,748 filed Sep. 12, 1997.

1. Field of the Invention

This invention relates to gasification power generating systems wherein a hydrocarbonaceous fuel is partially oxidized in a gasifier to produce a synthesis gas or syngas which can be used as a fuel in a combustion turbine to produce power, and more specifically to a process for the selective removal of $H_2S$ and COS from the syngas while retaining the values associated with $CO_2$ and other gases for power production. It also relates to a process for removing $CO_2$ from the hydrogen content of the syngas.

2. Description of the Prior Art $H_2S$ and COS are generally removed from the syngas produced by the partial oxidation of a hydrocarbonaceous fuel before the syngas is burned as a high pressure fuel gas in a combustion turbine to drive a generator and produce power. One technique utilizes physical or chemical absorption with a liquid solvent, as disclosed in U.S. Pat. No. 5,345,756 to Jahnke et al. In the process of removing the $H_2S$ and COS from the syngas, other acid gases, such as $CO_2$, are undesirably removed with the $H_2S$ and COS. The retention of $CO_2$ is desirable because its presence in the high pressure fuel gas generates power when it is expanded in the gas turbine.

Hydrogen is a component of the synthesis gas produced by the partial oxidation of a hydrocarbonaceous fuel. The synthesis gas is purified before use. See U.S. Pat. No. 5,152,975 to Fong et al. Procedures for such purification would be more efficient if the $CO_2$ present in the hydrogen stream could be removed from the hydrogen prior to purification.

To achieve desired $SO_2$ emission limits, approximately 97% of $H_2S$+COS must be removed and recovered, typically as elemental sulfur in a Claus plant.

Early attempts to use $N_2$ to strip coabsorbed $CO_2$ from physical solvents were either at high pressure, at essentially the same pressure as the $H_2S$ absorption, or at essentially atmospheric pressure. Because the stripping gas requirement increases in direct proportion to pressure, compressing the increased quantity of $N_2$ to the higher pressure was considered to be practicable only in the case where $NH_3$ is being produced and the $N_2$ compression is already required.

A $N_2$ stripping stage to enrich the Claus plant acid gas feed has been used for some time. In one process, it operates at essentially atmospheric pressure and includes a bottom $CO_2$ stripping section surmounted by an $H_2S$ reabsorber section. In operation it uses $N_2$ to strip some $CO_2$ from the solvent. $H_2S$ in the stripped $CO_2$ is reabsorbed with an $H_2S$ solvent to give an $N_2$ plus $CO_2$ vent stream containing an acceptable amount of about 10 ppm of $H_2S$. While operation at low pressure minimizes the $N_2$ stripping gas requirement which is directly proportional to pressure, it increases the solvent flow required to reabsorb the $H_2S$ which is inversely proportional to operating pressure. Because the reabsorbtion solvent flow is generally added to the main absorber solvent for regeneration, it increases the regeneration steam requirement. As a result, $N_2$ stripping at low pressure to obtain a concentrated Claus $H_2S$ stream is unattractive because regeneration solvent flows are excessive and result in prohibitive solvent regeneration steam and refrigeration requirements. Also, the stripped carbon dioxide along with the nitrogen strip gas is vented to the atmosphere and does not contribute to power production in the combustion turbine.

A selective acid gas removal process is required to absorb essentially all the $H_2S$ while coabsorbing a minimum amount of $CO_2$. Minimum $CO_2$ removal is required to obtain a concentrated $H_2S$ Claus plant feed to minimize the capital and operating costs of the Claus plant. Co-absorption of $CO_2$ not only dilutes the Claus $H_2S$ feed, it also decreases the integrated gasification combined cycle (IGCC) power generation thermal efficiency. Since the $CO_2$ in the high pressure fuel gas generates power when it is expanded in the gas turbine, its removal with the $H_2S$ loses that power generation potential.

The problem is that available acid gas removal processes are not sufficiently selective and co-absorb significant $CO_2$. The most selective physical solvents, such as mixed dialkylethers of polyethylene glycol and N methyl pyrrolidone coabsorb over 15% of the $CO_2$ when solvent flow is set to remove essentially all of the $H_2S$. This results in a very dilute acid gas which cannot be processed in a conventional Claus plant. In commercial practice an expensive $H_2S$ selective amine preconcentration is used to increase the Claus feed to 25% $H_2S$. Even at this concentration the purification is very expensive.

U.S. Pat. No. 4,242,108 to Nicholas et al solves the problem of obtaining a concentrated Claus $H_2S$ feed gas by a process utilizing an $H_2S$ absorber, a $CO_2$ absorber, a $H_2S$ stripper and tho $CO_2$ strippers. The process involves heating the $H_2S$ absorber bottoms solvent and feeding it to a high pressure $CO_2$ stripping column operating at essentially the same pressure as the $H_2S$ absorber and stripping the coabsorbed $CO_2$ with a high pressure $CO_2$-free inert gas. Nicholas et al notes the possibility of using high pressure $N_2$ from an air separation unit, however, this disclosure of $N_2$ use appears limited to $NH_3$ applications where $N_2$ has to be compressed and added to the $H_2$ after acid gas removal to make $NH_3$ synthesis gas. This application merely routes a portion of the required $N_2$ through the stripper for beneficial effects and appears limited to situations where $CO_2$ is rejected from the product gas as in $NH_3$ synthesis. A major problem with this process is the loss of $CO_2$ which is vented after being flashed off and the loss of $CO_2$ and $N_2$ from the second $CO_2$ stripper.

U.S. Pat. No. 4,568,364 to Galstaun et al discloses the advantage of adding carbon dioxide to a fuel gas for a gas turbine to decrease excess air compression with resultant increase in turbine net power. Also discussed is the advantage in low sulfur coal gasification applications of using nitrogen to strip coabsorbed carbon dioxide from hydrogen sulfide loaded solvent to obtain, after final hydrogen sulfide stripping, an acceptably concentrated hydrogen sulfide Claus feed gas. Galstaun's process, however, depends on using the selective hydrogen sulfide/carbon dioxide physical solvent acid gas removal system of an adjacent operation producing hydrogen to get the combined advantages of carbon dioxide addition to the fuel gas and the use of nitrogen stripping to obtain a concentrated Claus hydrogen sulfide feed gas. Galstaun imports carbon dioxide into the fuel gas stream by using carbon dioxide loaded solvent from the adjacent hydrogen plant carbon dioxide removal step. Galstaun does not recover coabsorbed carbon dioxide flashed or stripped with nitrogen from the hydrogen sulfide loaded solvent into the fuel gas. Nor does Galstaun recover nitrogen used for stripping into the fuel gas to produce the same advantages in the turbine operation that the carbon dioxide does. Because Galstaun's nitrogen stripper effluent is inevitably contaminated with hydrogen sulfide, it cannot be vented to the atmosphere. Therefore, the gas is sent to the adjacent carbon dioxide stripper where the contained hydrogen sulfide is reabsorbed for recovery.

U.S. Pat. Nos. 4,957,515 and 5,240,476, both to Hegarty, offer a solution to the problem of obtaining a concentrated $H_2S$ feed to a Claus unit while retaining the $CO_2$ content of the syngas as feed to the gas turbine to maximize power recovery. Hegarty uses a small amount of $N_2$ under pressure to strip coabsorbed $CO_2$ from the rich physical solvent for recycle to the fuel gas, free of $H_2S$.

In both Hegarty patents, the $H_2S$ and $CO_2$ rich solvent from the $H_2S$ absorber bottoms, at about 500 psia, is used to drive a turbine to reduce the pressure to about 90 psia, after which the solvent is stripped of $CO_2$ using $N_2$ in a $CO_2$ stripper operated at 78 psia. The gases from the stripper are recycled while the $H_2S$ laden solvent is sent to an $H_2S$ stripper. In the '476 Hegarty patent the $CO_2$ rich gases are recompressed and sent directly to the single $H_2S$ absorber. In the '515 Hegarty patent the recompression step is replaced by reabsorption of $H_2S$ in a secondary $H_2S$ absorber. The $CO_2$ values are absorbed in a solvent and the solvent recycled to the $H_2S$ absorber; the $H_2S$ contaminated nitrogen stripping gas is vented. Nitrogen used in the $CO_2$ stripper is also vented.

These processes respectively suffer from the energy need to recompress the $CO_2$ rich recycle to the $H_2S$ absorber from 78 psia to 500 psia and from the venting of $N_2$ to the atmosphere.

What is needed is a purification process that yields a concentrated $H_2S$ Claus feed, that retains the value of $CO_2$, and that does not require excessive pressure changes, or process heating or refrigeration.

SUMMARY OF THE INVENTION

This invention is an integrated process which removes acidic gases such as $H_2S$, COS and $CO_2$ from raw synthesis gas. The $H_2S$ and COS is concentrated and separately recovered. The separately recovered $CO_2$ is used as a moderator with the purified syngas in a combustion turbine. The process comprises separating $H_2S$ and COS from a raw synthesis gas by absorption with a liquid solvent, removing coabsorbed $CO_2$ by stripping the solvent with nitrogen, separating the $H_2S$ and COS from the solvent and recovering sulfur from the $H_2S$ and COS. The energy value of the $CO_2$ and its value as a diluent in reducing $NO_x$ is recovered by using the $CO_2$ as a moderator during combustion of the purified synthesis gas in a gas turbine.

BRIEF DESCRIPTION OF THE DRAWINGS

Corresponding reference numbers indicate corresponding parts in each of the figures.

DESCRIPTION OF THE PREFERRED EMBODIMENTS

Figure 1:
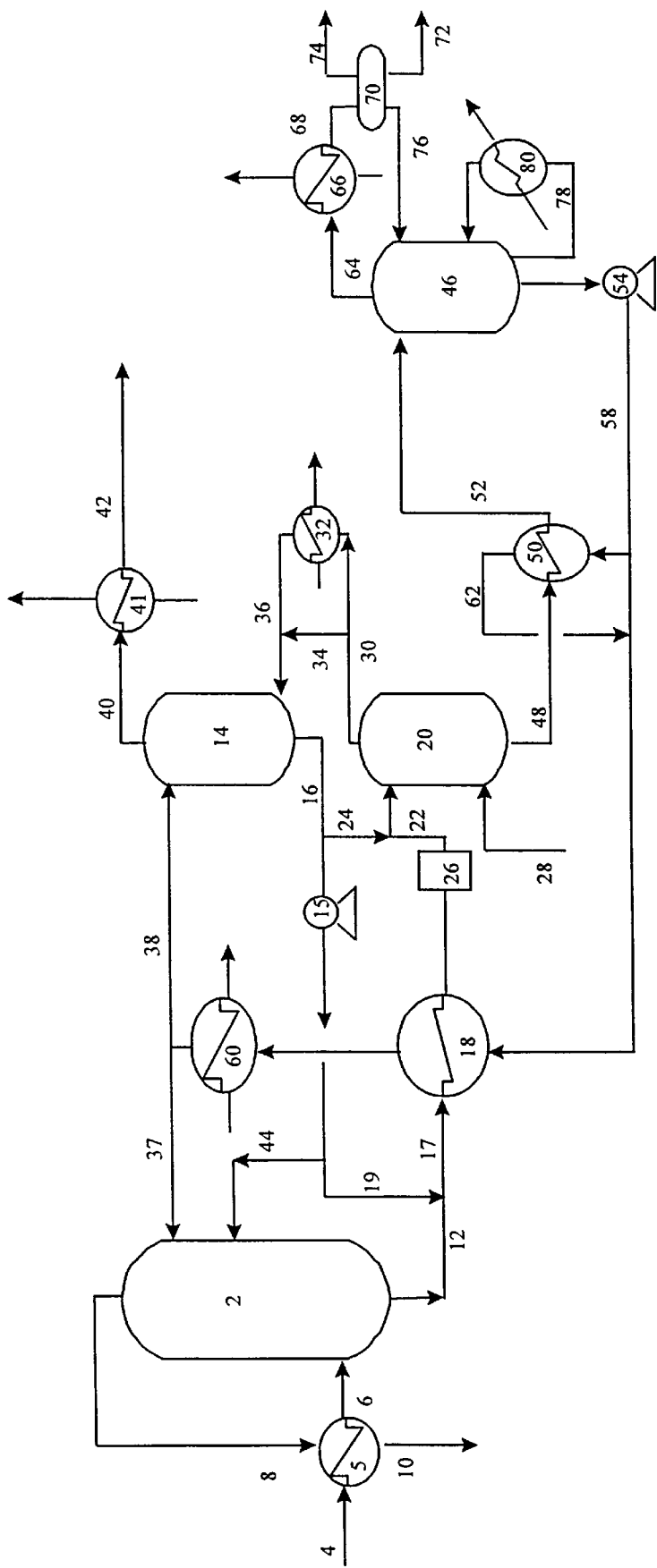
FIG. 1 is a schematic diagram showing the removal of $H_2S$ from the synthesis gas product from a gasifier.

The present invention comprises a process for removing acid gases such as $H_2S$ and COS from synthesis gas before the synthesis gas is burned as a fuel in a combustion turbine to drive a generator and produce power. The $H_2S$ and COS are removed as undesirable contaminants from the synthesis gas while other acid gases, such as $CO_2$ are retained in the fuel streams fed to the combustion turbine.

In one embodiment, the $CO_2$ loss is reduced to a very low level by the use of a solvent for acid gases to remove acid gases from the syngas followed by the use of $N_2$ at an intermediate pressure of 300 psig,±100 psig, preferably 300 psig±50 psig, to strip the solvent of absorbed $CO_2$.

Clean solvent is regenerated by removal of $H_2S$ by steam reboiling and recycled. The nitrogen stream, containing $CO_2$ and some $H_2S$ is washed with clean solvent. The $H_2S$-free stream of nitrogen and $CO_2$ is utilized in the combustion turbine. The $H_2S$ is sent to a Claus unit for further processing.

This invention also comprises operative steps for removing $CO_2$ from hydrogen produced by partial oxidation of a hydrocarbonaceous fuel and subsequent shift conversion to form shifted syngas.

In a gasification power system wherein a hydrocarbonaceous fuel is partially oxidized to produce a synthesis gas or syngas from a gasification reactor or gasifier at a pressure of about 1000 psig±300 psig, preferably about 1000 psig±150 psig, the raw synthesis gas exiting the gasifier primarily comprises $H_2$, CO, $CO_2$, $H_2O$, and to a lesser extent $N_2$, Ar, $H_2S$, COS, $CH_4$, $NH_3$, HCN, HCOOH. Environmental concerns require the removal of $H_2S$ and COS from syngas that will be burned in a combustion turbine.

In removing $H_2S$ and COS from syngas, it is desirable to minimize removal of other acidic gases, such as $CO_2$ to avoid dilution of the $H_2S$ stream sent to the Claus unit and to maximize the amount of $CO_2$ sent to the combustion turbine. Increasing the $CO_2$ to the combustion turbine increases the power produced as the $CO_2$ is expanded in the combustion turbine and at the same time, minimizes oxides of nitrogen ($NO_x$) formation by lowering the combustion flame temperature.

This separation is accomplished by sending the syngas to an acid gas recovery unit where it is treated in a first $H_2S$ absorber which uses a liquid solvent for the removal of $H_2S$. Significant amounts of $CO_2$ are also removed by the $H_2S$ solvent in the first $H_2S$ absorber, even though the high pressure in the absorber reduces solvent circulation. To recover the $CO_2$ absorbed in the acid gas solvent, also referred to as the "rich solvent," the rich solvent is heated and the pressure reduced to about 300 psig to desorb the $CO_2$.

The flashed solvent is sent to a $N_2$ stripper to remove additional $CO_2$. At 300 psig, the desorbed $CO_2$ and stripping nitrogen can be fed to the combustion turbine without further compression as a diluent to control $NO_x$ and to increase power output. Diluent $N_2$ is normally produced from an air separation unit for that purpose and is readily available for stripping at the required pressure.

Because a small amount of $H_2S$ is stripped with the $CO_2$ in the $N_2$ stripper, the stripped $H_2S$ is reabsorbed from the $N_2$ in a secondary $H_2S$ absorber.

It is to be understood throughout this disclosure that the removal of $H_2S$ also encompasses the removal of COS unless otherwise specified.

In accordance with one embodiment of the present invention, $CO_2$ removal is reduced to a very low level by the use of $N_2$ at intermediate pressure to strip the acid gas solvent of absorbed $CO_2$.

With reference to FIG. 1, a sour unshifted synthesis gas or syngas 4 principally comprising $H_2$, CO, $CO_2$ and $H_2S$ at a temperature of 200° F.±125° F., typically 150° F.±50° F., a pressure of 1500 psig±1000 psig, typically 1100 psig±400 psig, enters heat exchanger 5 where it is cooled to a temperature of about 90° F.±50° F., typically 110° F.±10° F., and exits as stream 6. The term "sour" refers to a synthesis gas containing sulfur, whereas the term "sweet" refers to a synthesis gas wherein the sulfur content has been removed.

The cooled unshifted sour syngas stream 6 enters the first $H_2S$ absorber 2 at a pressure of about 1000 psig wherein it contacts a chemical or physical solvent for acid gases, preferably a physical solvent such as methanol and N-methyl pyrrolidone, and most preferably dimethyl ether of polyethylene glycol, available commercially as SELEXOL® (Union Carbide). The temperatures and pressures shown are based on SELEXOL® and may vary significantly for other solvents.

The sulfur-containing gases such as $H_2S$ and COS are removed. The cleaned, unshifted, sweet syngas 8, at a temperature of about 60° F. to about 130° F. exits $H_2S$ absorber 2 and enters heat exchanger 5 in indirect heat exchange with the sour unshifted syngas 4.

The warmed clean unshifted syngas 10 comprising $H_2$, CO and some $CO_2$ at a pressure of about 1000 psig exits heat exchanger 5 and is directed to the combustion turbine (not shown) after being saturated with water, heated and expanded to the proper conditions for combustion in the turbine.

The liquid stream of $H_2S$ rich solvent, including some absorbed $CO_2$, exits the first $H_2S$ absorber 2 via line 12 and can be optionally combined with recycle solvent 16 exiting the second $H_2S$ absorber 14. The combined solvent 17 is preheated in heat exchanger 18 before entering the $CO_2$ stripper 20 through line 22. Solvent stream 16 exits the second $H_2S$ absorber 14. A portion or all of the solvent stream represented by line 24 can be separated and combined with the stream 22 of $H_2S$ rich solvent entering the $CO_2$ stripper 20. A pressure reduction device 26 reduces the pressure to about 300 psig, which are the pressure conditions at which the stripper 20 operates.

$CO_2$ removal is accomplished by nitrogen stripping. Nitrogen gas stream 28 at a pressure of about 300 psig enters the $CO_2$ stripper 20 and strips or desorbs the $CO_2$ and a small amount of $H_2S$ from the solvent before exiting the stripper 20 through line 30.

Because a small amount of $H_2S$ is stripped with the $CO_2$, the $CO_2$ and $H_2S$ containing nitrogen stream 30 from the $CO_2$ stripper 20 is sent to the second $H_2S$ absorber 14 where the $H_2S$ content is reabsorbed in a solvent. The $CO_2$ and $H_2S$ containing $N_2$ stream 30 can be fed directly to the second $H_2S$ absorber 14, or a portion or all of the $CO_2$ and $H_2S$ containing $N_2$ stream represented by line 36 can be separated and cooled in heat exchanger 32 and combined with the uncooled portion 34 before entering the second $H_2S$ absorber 14. The second $H_2S$ absorber 14 and the $CO_2$ stripper 20 operate at the same pressure and can be combined into one vessel.

Solvent 38 enters the secondary $H_2S$ absorber 14 and removes the $H_2S$ from the entering $CO_2$ and $H_2S$ containing nitrogen stream. Nitrogen stream 40, removed of the $H_2S$ and containing $CO_2$ exits via line 40, and is passed through heat exchanger 41. The $CO_2$-rich nitrogen stream exits via line 42 at a pressure of about 300 psig±100 psig, preferably about 300 psig±50 psig, and can be fed to the combustion turbine without further compression as a diluent to control $NO_x$ and increase power output. Diluent $N_2$ is normally produced from an air separation unit (not shown) for that purpose and is readily available for stripping at the required pressure.

Semi-rich solvent 16 containing $H_2S$, exits the second $H_2S$ absorber 14 and can be recycled totally or in part to either the first $H_2S$ absorber 2 via line 44, or combined with the solvent 12 exiting the first $H_2S$ absorber 2 to form stream 17, or separated via line 24 and combined with the preheated solvent 22 entering $CO_2$ stripper 20. Pump 15 increases the pressure of the solvent stream 16 exiting $H_2S$ absorber 14 from about 300 psig to about 1000 psig. All or a portion of the solvent stream enters the first $H_2S$ absorber 2 via line 44 or it can be combined via line 19 with the solvent 12 exiting the first $H_2S$ absorber.

The $H_2S$-containing solvent 48 exiting the $CO_2$ stripper 20 is then passed to the $H_2S$ stripper 46. The $H_2S$-containing solvent 48 is heated in heat exchanger 50 and enters the $H_2S$ stripper 46 via line 52. Because $N_2$ is only slightly absorbed in the solvent, the $N_2$ content of the $H_2S$-containing solvent 52 is minimal. Thus, a highly concentrated $H_2S$ product stream 64 for a Claus or other sulfur processing unit is produced. The solvent 58 stripped of $H_2S$ exits $H_2S$ stripper 46, and after passing through pump 54 and heat exchangers 18 and 60 can be recycled to the first $H_2S$ absorber via line 37 and to the second $H_2S$ absorber via line 38.

The temperature within the $CO_2$ stripper 20 may be controlled at its optimum level of about 150° F. to about 250° F. by recovering part of the heat from the solvent 58 exiting $H_2S$ stripper 46 and passing through heat exchanger 18. Another option is for all or a portion of solvent stream 58 to pass through heat exchanger 50 in counter-current exchange with the solvent 48 exiting the $CO_2$ stripper 20, before entering heat exchanger 18.

In $H_2S$ stripper 46 the solvent is reboiled with steam in indirect heat exchanger 80 via line 78 to strip $H_2S$. The $H_2S$ exits overhead via line 64 where it is cooled in heat exchanger 66 to condense water. The mixed liquid vapor stream enters separator 70 via line 68 where a portion of the liquid $H_2O$ leaves via line 72 and the $H_2S$ rich product leaves via line 74 to the Claus unit (not shown). A portion of the $H_2O$ is recycled via line 76 to maintain the desired $H_2O$-solvent balance.

Figure 2:
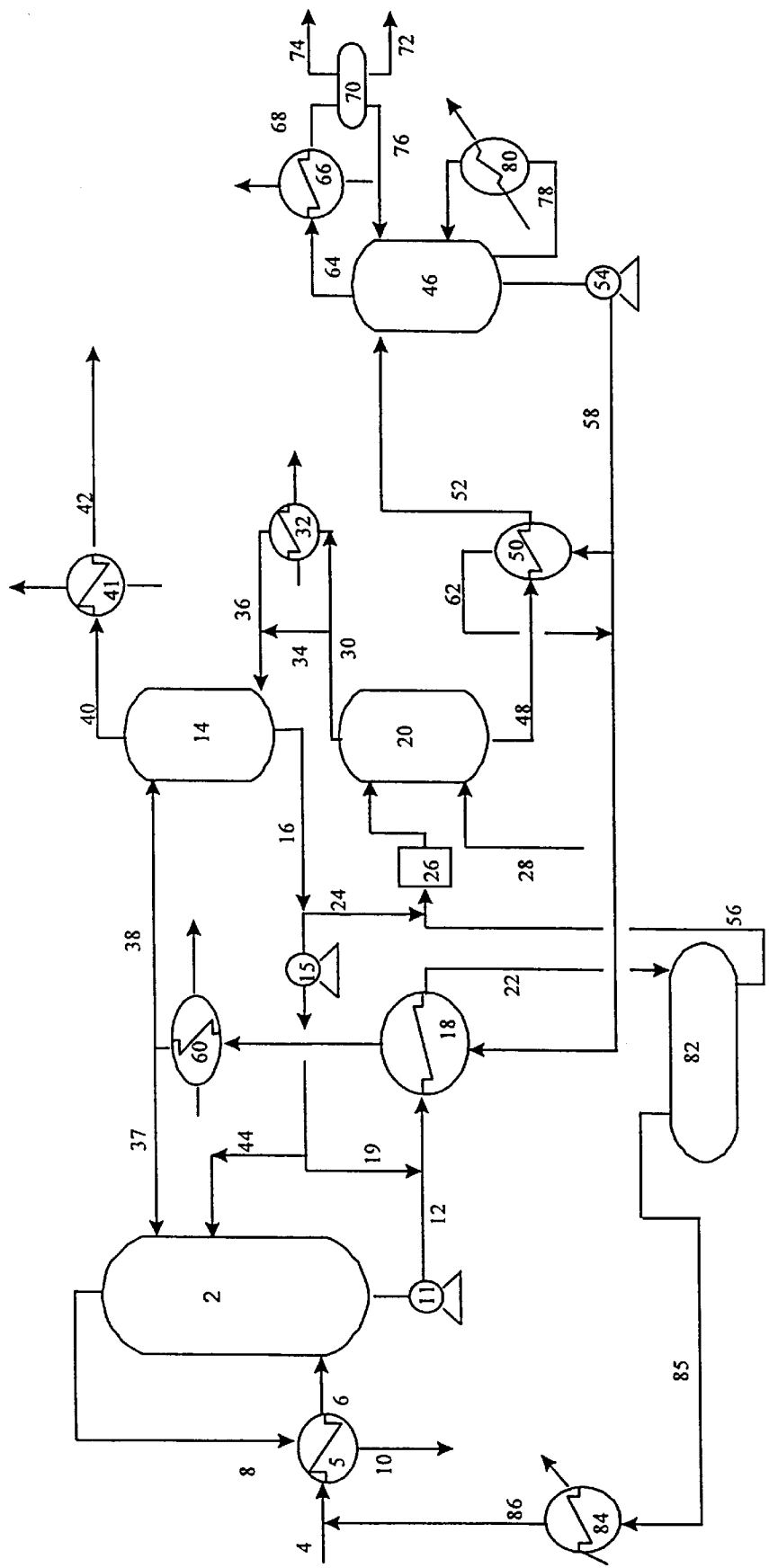
FIG. 2 is a schematic diagram showing improved $H_2S$ gas removal using a high pressure flash drum.

FIG. 2 shows an alternative configuration for improved gas removal using a high pressure flash drum operating at a pressure of 1000 psig±300 psig, preferably about 1000 psig±150 psig. The solvent is flashed at a temperature of about 150° F. to about 250° F. This embodiment recovers more $CO_2$ at higher pressure and will reduce the size of the secondary $H_2S$ absorber 14.

In this embodiment solvent 12 with acidic gases exits the first $H_2S$ absorber 2 through the pump 11 and exits heat exchanger 18 as preheated solvent stream 22. Instead of flowing directly to the $CO_2$ stripper, stream 22 is diverted to a flash drum 82 where about 5% to 25% of the $H_2S$ and about 10% to 70% of the $CO_2$ are flashed off. The acid gas depleted solvent flows to the $CO_2$ stripper 20 through line 56. The flashed gases 85 are returned to the first $H_2S$ absorber 2 and combined with the sour unshifted gas 4, after being cooled in exchanger 84 and exiting via line 86.

It is sometimes desired to produce large quantities of hydrogen along with power from a gasification unit. In such instances a portion of the syngas from the gasifier is shifted to hydrogen in a reactor according to the reaction $CO+H_2O \rightarrow CO_2+H_2$. See for example U.S. Pat. No. 5,152,975 to Fong et al., incorporated herein by reference. The remainder of the syngas is cooled without shifting and, after further processing, sent to a combustion turbine.

The shifted gas is purified by a number of conventional means. One of the most efficient techniques utilized to purify the shifted gas is by means of a pressure swing absorption (PSA) process which removes impurities by use of a pressure change on the adsorbent beds. The shifted gas unfortunately contains a large quantity of $CO_2$. This is undesirable since the $CO_2$ reduces the recovery of the hydrogen in the PSA. Furthermore, since $CO_2$ has no heating value, its presence in the PSA tail gas diminishes the heating value of the tail gas.

Other techniques of $H_2$ purification, such as methanation, also operate more efficiently when there is full removal of $CO_2$ from the shifted gas.

For production of power, it is desirable to have $CO_2$ in the syngas since it helps reduce $NO_x$ formation by lowering the combustion flame temperature and also provides power as it runs through the expander side of the combustion turbine.

A novel and effective technique of accomplishing $CO_2$ removal and concentration is to combine the use of a physical solvent or other suitable solvent for acid gases to remove the $CO_2$ from the shifted gas to be fed to the PSA or other purification process while maximizing the content of $CO_2$ in the syngas used to fuel the combustion turbine.

Figure 3:
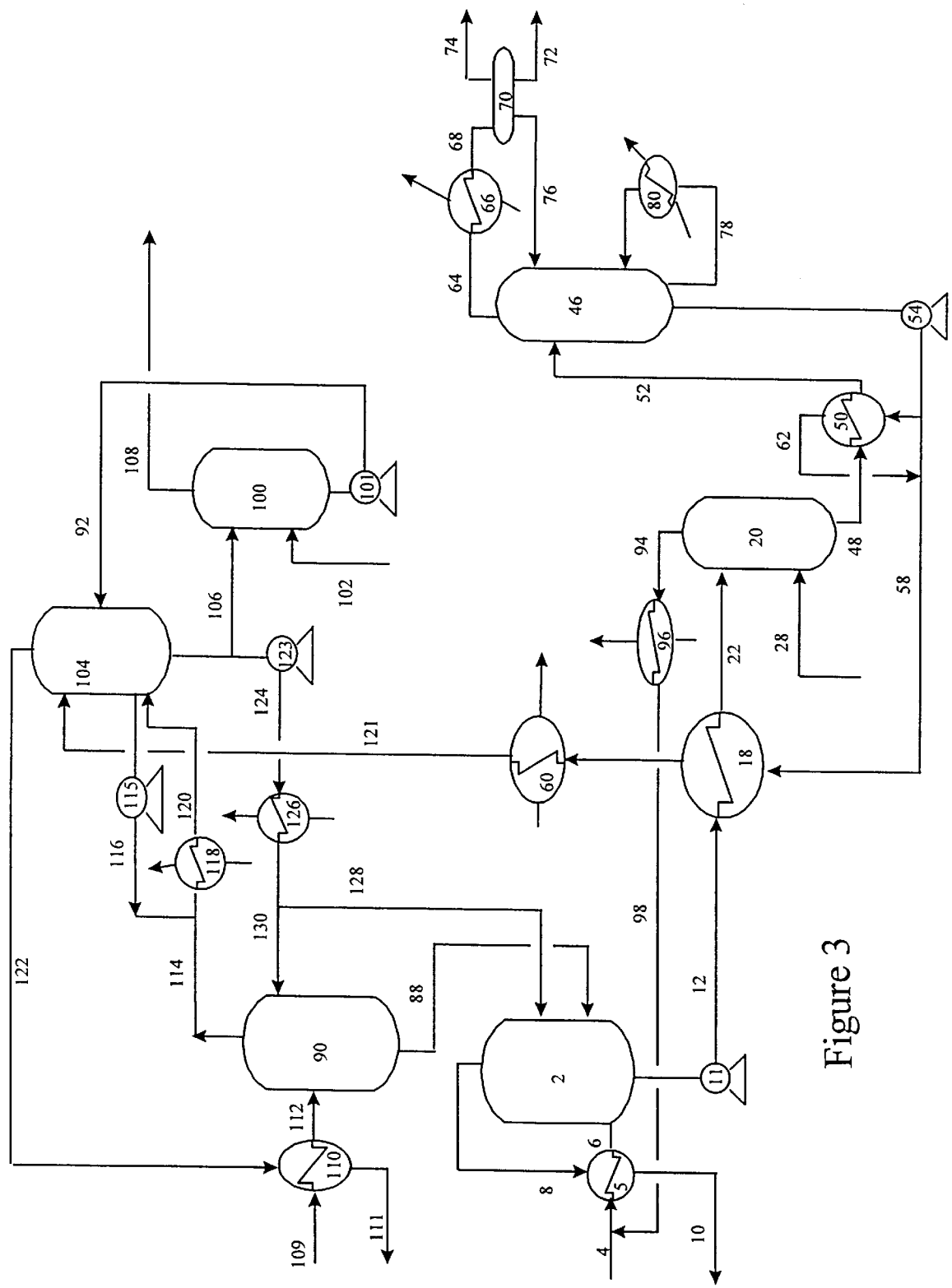
FIG. 3 is a schematic diagram showing the removal of $H_2S$ in an integrated acid gas removal unit.

This is accomplished by combining the above features in the processing steps shown in FIG. 3.

Referring to FIG. 3, $H_2S$ and $CO_2$ depleted shifted gas, consisting primarily of hydrogen, is produced from sour shifted syngas which has been subjected to $H_2S$ removal in shifted gas $H_2S$ absorber 90 and $CO_2$ removal in $CO_2$ absorber 104.

The sour shifted gas 109 from the gasifier (not shown) enters shifted gas $H_2S$ absorber 90 through heat exchanger 110 and line 112. The $H_2S$ depleted gas leaves the $H_2S$ absorber 90 via line 114, is combined with solvent stream 116 from pump 115 and the $CO_2$ absorber 104, is cooled in heat exchanger 118 and enters $CO_2$ absorber 104 via line 120. In $CO_2$ absorber 104 the syngas 120 is contacted with clean solvent recycle from the sweet $CO_2$ stripper 100 via pump 101 and line 92 and cooled clean solvent from the $H_2S$ stripper 46 via lines 58 and 121. The $H_2S$ and $CO_2$ depleted product gas 111, containing mostly hydrogen, is sent to the PSA or other purification procedure via line 122 and heat exchanger 110.

A $CO_2$ rich nitrogen stream 108 suitable as a diluent feed to the combustion turbine (not shown) is produced from shifted syngas by removing $H_2S$ in a shift gas $H_2S$ absorber 90, followed by solvent absorption of $CO_2$ in the $H_2S$ depleted syngas from exit stream 114 in the $CO_2$ absorber 104 and nitrogen stripping of the $CO_2$ rich solvent 106 in the sweet $CO_2$ stripper 100.

A portion 128 of the $CO_2$ rich solvent 124 exiting the $CO_2$ absorber 104 is recycled to the first $H_2S$ absorber 2 and a portion 130 is recycled to the shift gas $H_2S$ absorber 90 where it absorbs $H_2S$.

There are three distinctive features to the combined process.

The first feature takes the $CO_2/H_2S$-rich solvent from the bottom of the shifted gas $H_2S$ absorber 90 and introduces it via line 88 into the lower part of the first $H_2S$ absorber 2, which is also referred to as unshifted gas $H_2S$ absorber 2. Because the unshifted gas has a much lower $CO_2$ content and partial pressure than the $CO_2/H_2S$-rich solvent, the unshifted gas $H_2S$ absorber 2 strips the $CO_2$ from the $CO_2/H_2S$-rich solvent.

The second feature heats the $CO_2/H_2S$-rich solvent 12 from the unshifted gas absorber 2 and strips the rich solvent 22 with a sufficient amount of nitrogen or other suitable stripping gas to desorb the $CO_2$ from the $CO_2$ stripper 20 operated at about 1000±150 psig. The $CO_2/H_2S$-rich solvent leaves the first $H_2S$ absorber 2 via pump 11 and line 12, is preheated in heat exchanger 18 and enters the $CO_2$ stripper 20 via line 22. Nitrogen at about 1000 psig enters line 28. The $CO_2$ stripper 20 reduces the $CO_2$ content in the $CO_2/H_2S$-rich solvent prior to sending the solvent 48 to the $H_2S$ stripper 46 through optional heat exchanger 50 and line 52. The $CO_2$ containing nitrogen stream 94 is recycled to the first $H_2S$ absorber 2 through heat exchanger 96 and line 98 where it is combined with the raw, unshifted syngas feed 4 and is ultimately recovered as part of the syngas product 10 passing to the combustion turbine (not shown) wherein the $CO_2/N_2$ gas mixture functions as a moderator.

The third feature utilizes a $CO_2$ absorber 104 on the sweet shifted gas 122 which eventually passes to the PSA (not shown) or other $H_2$ purification process as stream 111. Normally such a $CO_2$ absorber would rely primarily on pressure differential to regenerate the solvent and vent the $CO_2$ at atmospheric pressure. However, in this invention the $CO_2$ rich solvent 106 exiting the $CO_2$ absorber 104 is directed to the sweet $CO_2$ stripper 100 where the $CO_2$ is stripped from the $CO_2$-rich solvent by $N_2$ stream 102. The sweet $CO_2$ stripper pressure is about 300 psig±100 psig, preferably about 300 psig±50 psig.

The $CO_2$ and $N_2$ product stream 108 exits from the sweet $CO_2$ stripper 100 and is sent to the combustion turbine (not shown).

Depending upon the quantity of nitrogen available and level of $CO_2$ desired in the $H_2$, it may be desirable to enhance the stripping of the $CO_2$ from the solvent 106 by heating the solvent prior to entering the sweet $CO_2$ stripper 100 and/or by flashing the stripped solvent 92 at atmospheric pressure after exiting the sweet $CO_2$ stripper 100.

However, it is preferred that these options not be used since heating requires additional equipment and cooling of the solvent. Flashing at atmospheric pressure vents the $CO_2$ and makes it unavailable to generate power in the gas turbine. Nevertheless, depending upon economic optimizations, these options may be attractive for specific cases.

This process also has the benefit of producing a concentrated stream 74 of $H_2S$. The utilization of a $CO_2$ stripper using nitrogen or some other non-soluble gas, such as $H_2$, after preheating the rich solvent is extremely effective in minimizing the $CO_2$ in the gas going to the Claus unit (not shown) to recover the sulfur values. An $H_2S$ purity of greater than 50% can be obtained using this process. This high concentration of $H_2S$ eliminates the need for special handling of the sour gas in the Claus unit and helps reduce the Claus unit size and cost.

A flash drum (not shown) between the sour $CO_2$ stripper 20 and the $H_2S$ stripper 46 can be used to eliminate additional $CO_2$ and stripping gas. This can produce an $H_2S$ concentration greater than 95%. However, the relatively small amounts of $CO_2$ remaining in the solvent after stripping provide a flash gas relatively rich in $H_2S$ and lean in $CO_2$ and this flash gas requires a compressor to recover the sour gas flashed at the lower pressure along with the $CO_2$.

Alternatively, a lower pressure sour $CO_2$ stripper can also be used in place of or in addition to the high pressure (1000 psig) sour $CO_2$ stripper 20 described in FIG. 3. The gas coming from the low pressure stripper is cleaned with a secondary absorber and then routed at about 300 psig±100 psig, preferably about 300 psig±50 psig to the combustion turbine (not shown) as described in FIGS. 1 and 2. The advantage of having a second sour $CO_2$ stripper operating at approximately 300 psig is the reduced gas flow which would need to be cleaned in the secondary absorber.

In another embodiment, the high pressure sour $CO_2$ stripper can be replaced with a flash drum at approximately 1000±300 psig, preferably about 1000 psig±150 psig followed by an approximately 300 psig±100 psig, preferably about 300 psig±50 psig stripper as shown in FIG. 2.

What is claimed is:

1. An integrated process for the separation, recovery and utilization of acidic gases comprising $H_2S$, COS and $CO_2$ contained in a raw synthesis gas produced from the high pressure partial oxidation of a hydrocarbonaceous reactant, comprising:

(a) contacting the raw synthesis gas with a first liquid solvent in a first acidic gas removal unit to selectively absorb and remove at least a portion of the acidic gas from the raw synthesis gas and produce a purified synthesis gas;

(b) selectively removing $CO_2$ from the first liquid solvent by stripping the liquid solvent with $N_2$ in a $CO_2$ stripper to selectively remove the $CO_2$ and form a first $CO_2$-rich nitrogen gaseous mixture and a first solvent residue containing $H_2S$ and COS, wherein the pressure of the liquid solvent is reduced prior to entering the stripper;

(c) purifying the first solvent residue containing $H_2S$ and COS to recover the sulfur values;

(d) purifying the first $CO_2$-rich nitrogen gaseous mixture by contacting it with a second liquid solvent in a second acidic gas removal unit to remove residual $H_2S$ and COS and to produce a purified $CO_2$-rich nitrogen gaseous mixture and a second solvent residue containing $H_2S$ and COS; and (e) introducing the purified $CO_2$-rich nitrogen gaseous mixture without further compression into a combustion turbine to produce power, wherein it is contacted with the purified synthesis gas and serves as a moderator during the combustion of said synthesis gas.

2. The method of claim 1, wherein a portion of the $CO_2$ and the $H_2S$ content of the first liquid solvent is flashed off prior to the stripping treatment of step (b).

3. The method of claim 2, wherein the $CO_2$ and $H_2S$ flashed off is contacted with the raw synthesis gas prior to step (a).

4. An integrated process for the separation, recovery and utilization of acidic gases comprising $H_2S$, COS and $CO_2$ contained in a first separate stream of raw shifted synthesis gas and a second separate stream of raw unshifted synthesis gas comprising:

(a) contacting the raw shifted synthesis gas with a liquid solvent to selectively absorb and remove the acidic gases from the raw shifted synthesis gas, and to produce a first acid-rich liquid solvent and an acidic gas-depleted shifted synthesis gas;

(b) contacting the raw unshifted synthesis gas with the first acid-rich liquid solvent to selectively absorb and remove the acidic gases from the raw unshifted synthesis gas, and produce a purified unshifted synthesis gas and a second acid-rich liquid solvent;

(c) contacting the acidic gas-depleted shifted synthesis gas with a first $CO_2$ absorbent solvent, to produce a sweet shifted synthesis gas, and a first $CO_2$-rich solvent;

(d) selectively removing $CO_2$ from the first $CO_2$-rich solvent by stripping said solvent with $N_2$ gas to produce a first $CO_2$-rich nitrogen gaseous mixture and a first regenerated $CO_2$-absorbent solvent;

(e) introducing the first $CO_2$-rich nitrogen gaseous mixture without further compression into a combustion turbine to produce power, wherein it is contacted with the purified unshifted synthesis gas to serve as a moderator during the combustion of said purified unshifted synthesis gas;

(f) selectively removing $CO_2$ from the second acid-rich liquid solvent by stripping said solvent with $N_2$ gas to produce a second $CO_2$-rich nitrogen gaseous mixture and a first $H_2S$-rich liquid solvent; and (g) contracting the second $CO_2$-rich nitrogen gaseous mixture with the raw unshifted synthesis gas.

5. The process of claim 4, wherein a first portion of the first $CO_2$-rich solvent is used to contact the raw shifted synthesis gas in step (a).

6. The process of claim 4, wherein a second portion of the first $CO_2$-rich solvent is used to contact the raw unshifted synthesis gas in step (b).

7. The process of claim 4, wherein $H_2S$ is removed from the first $H_2S$-rich solvent in an $H_2S$ stripper to produce gaseous $H_2S$ and a first regenerated $H_2S$-absorbent solvent.

8. The process of claim 7, wherein the first regenerated $H_2S$-absorbent solvent is used to contact the sweet shifted synthesis gas in step (c).

9. The process of claim 4, wherein the sweet shifted synthesis gas from step (c) is subjected to a pressure swing absorption to extract hydrogen out of the sweet shifted synthesis gas or other hydrogen extraction process.

10. The process of claim 7, wherein the $H_2S$ is processed to recover sulfur values.

* * * * *

UNITED STATES PATENT AND TRADEMARK OFFICE
CERTIFICATE OF CORRECTION

PATENT NO : 6,090,356
DATED : July 18, 2000
INVENTOR(S) : Frederick C. Jahnke and William P. Volk It is certified that error appears in the above-identified patent and that said Letters Patent are hereby corrected as shown below:

In Column 1, line 62, change "reabsorbtion" to --reabsorption--.

In Column 2, line 31, change "tho" to --two--.

In Column 10, line 32, claim 4 (g), change "contracting" to --contacting--.

Signed and Sealed this

Twenty-second Day of May, 2001

NICHOLAS P. GODICI

Attest:

Attesting Officer    Acting Director of the United States Patent and Trademark Office